Fig. 12.

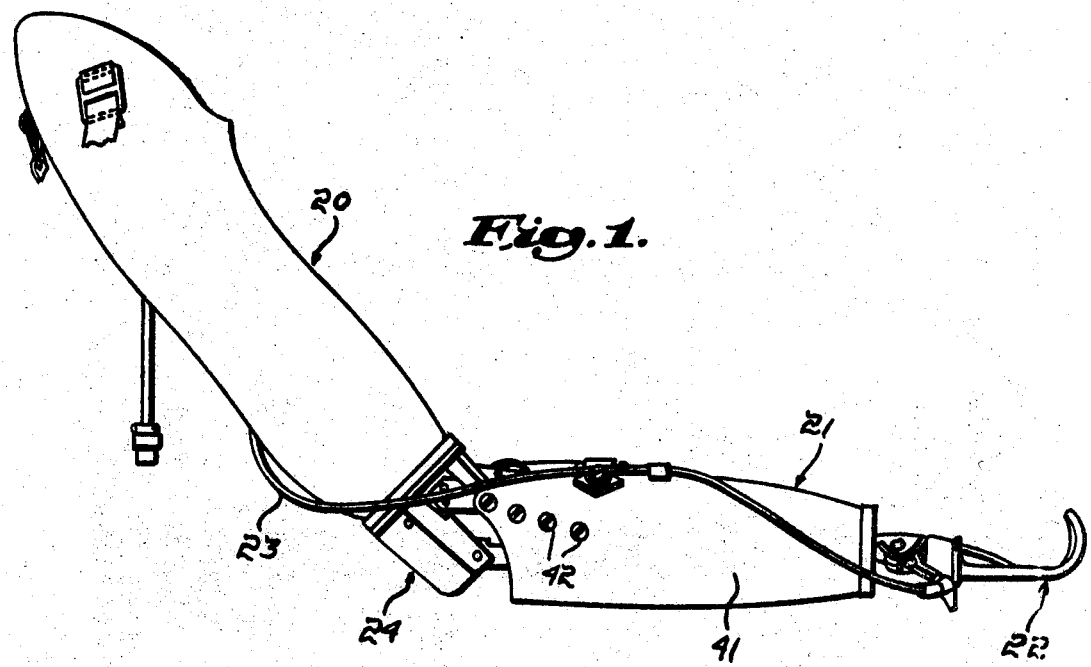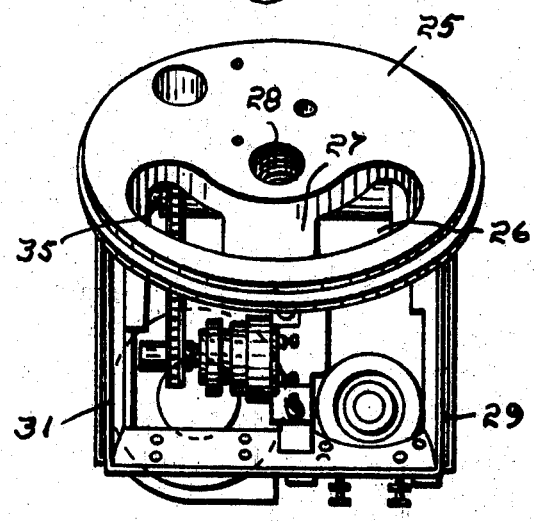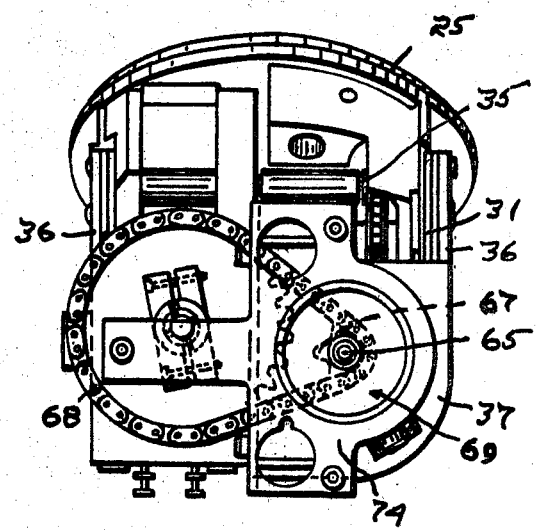

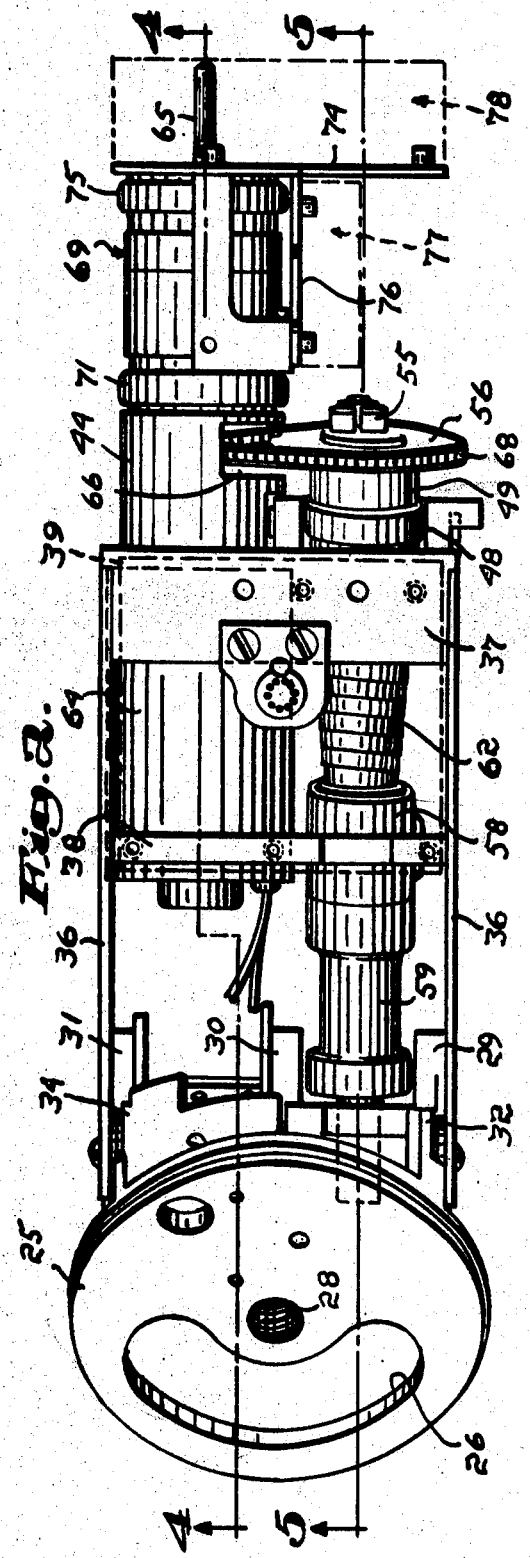
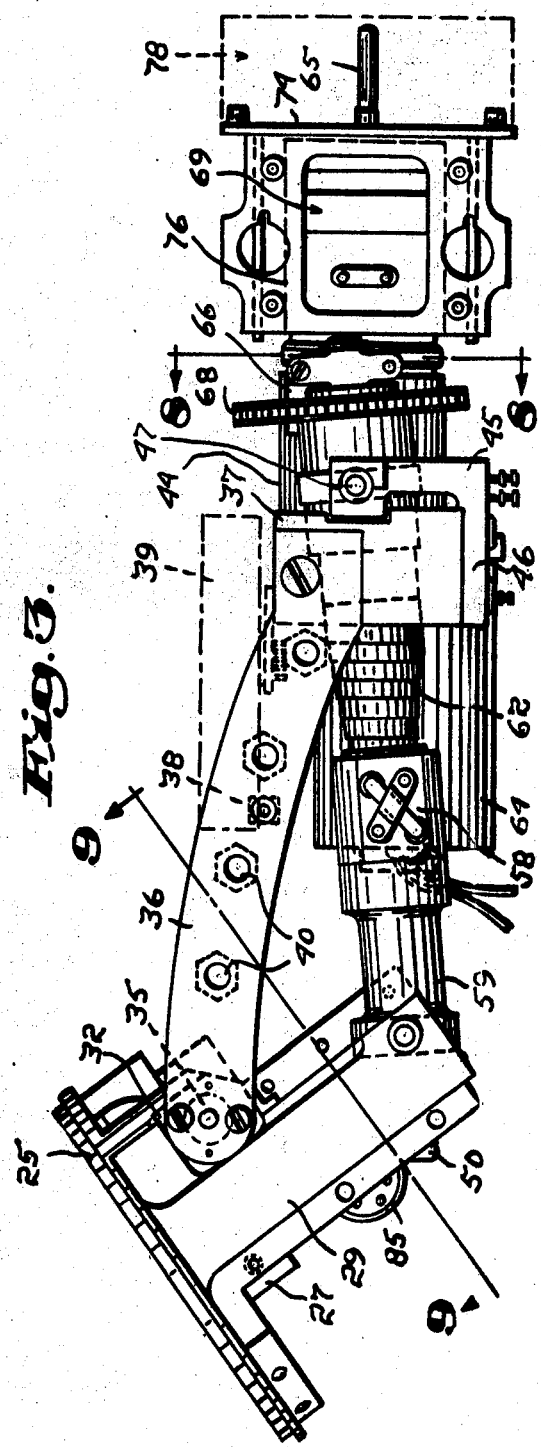

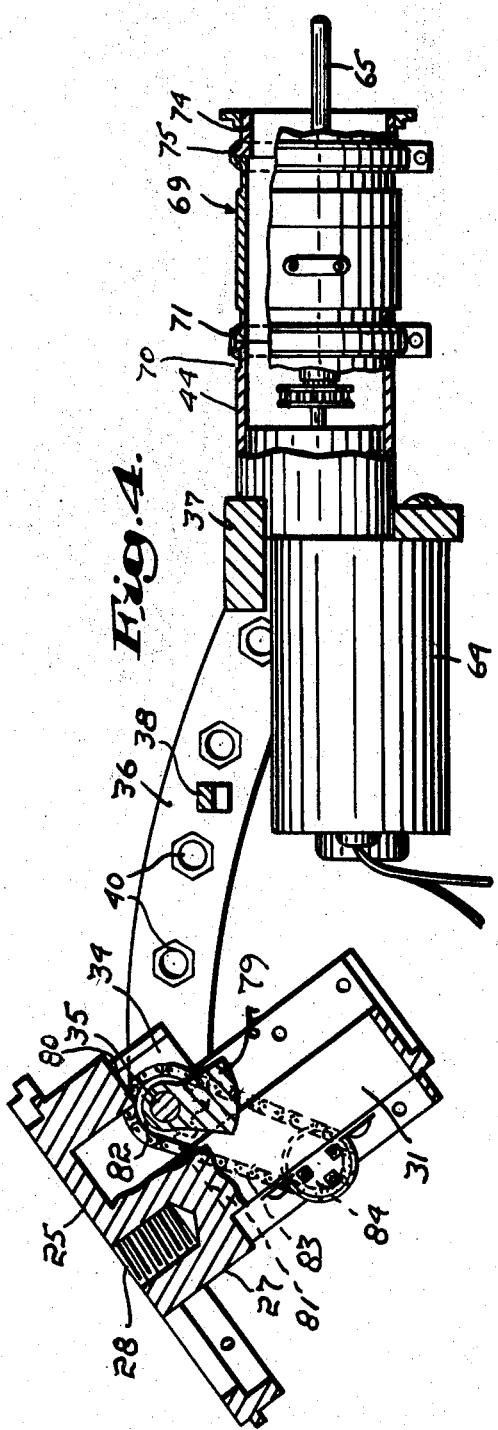

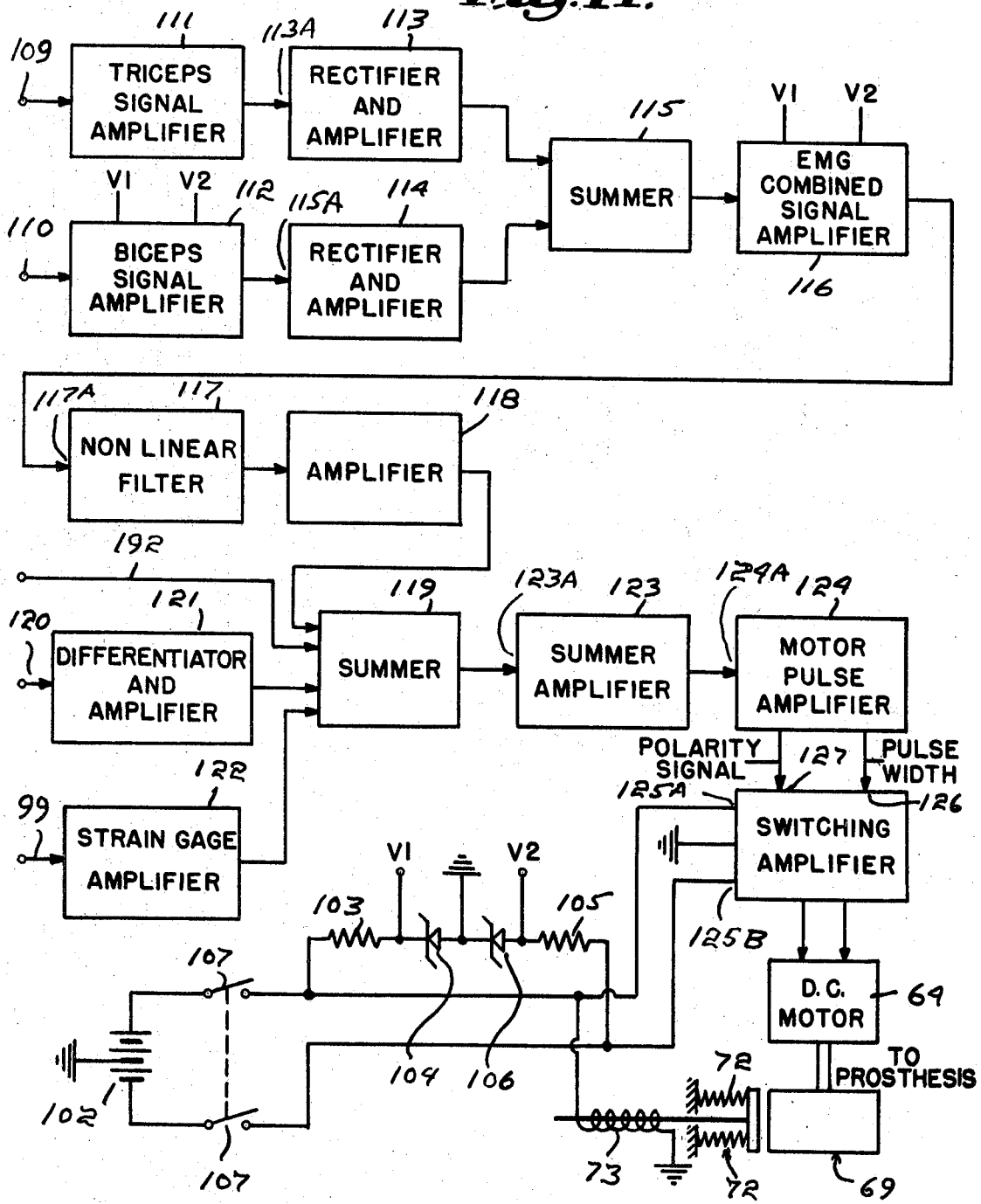

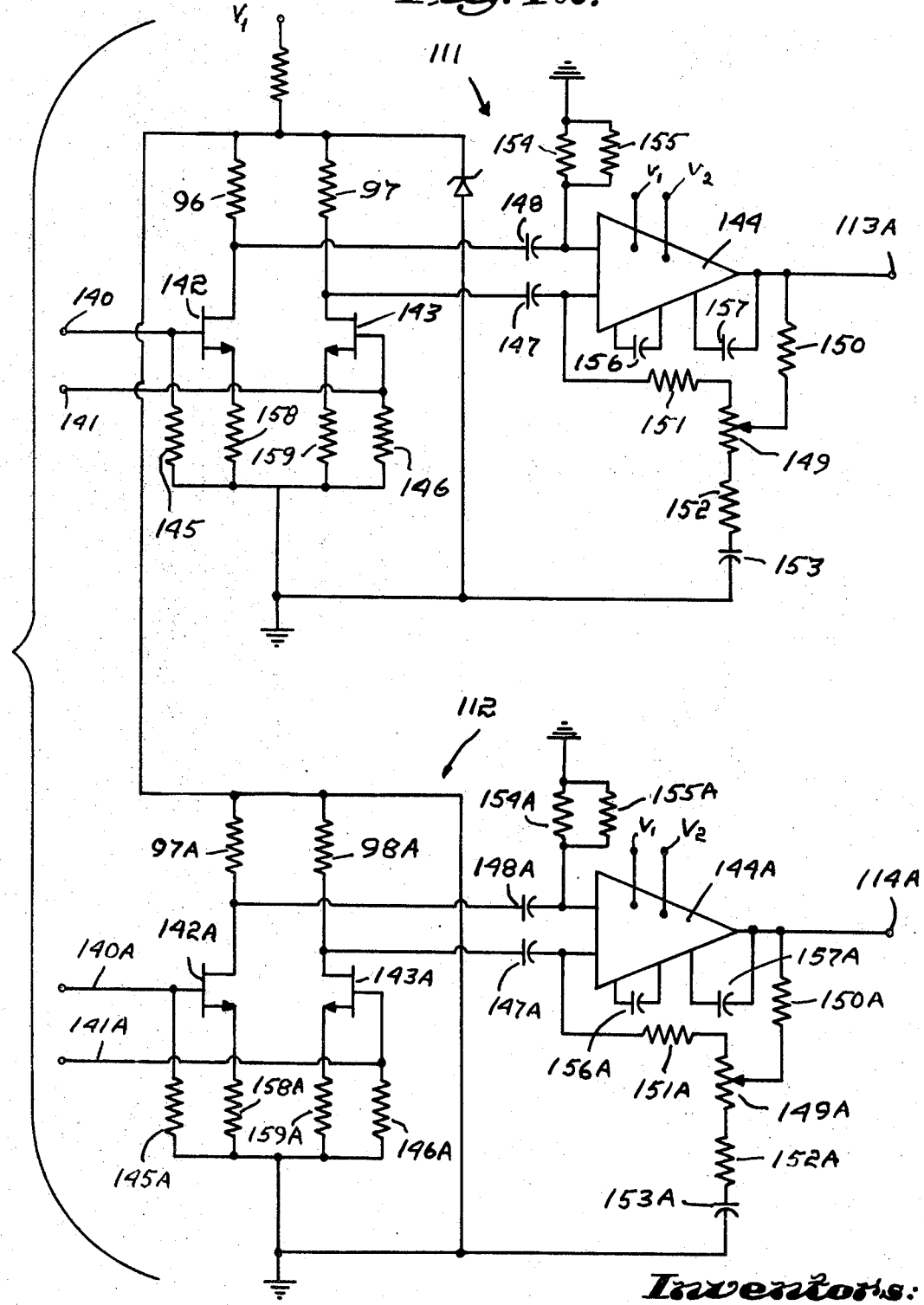

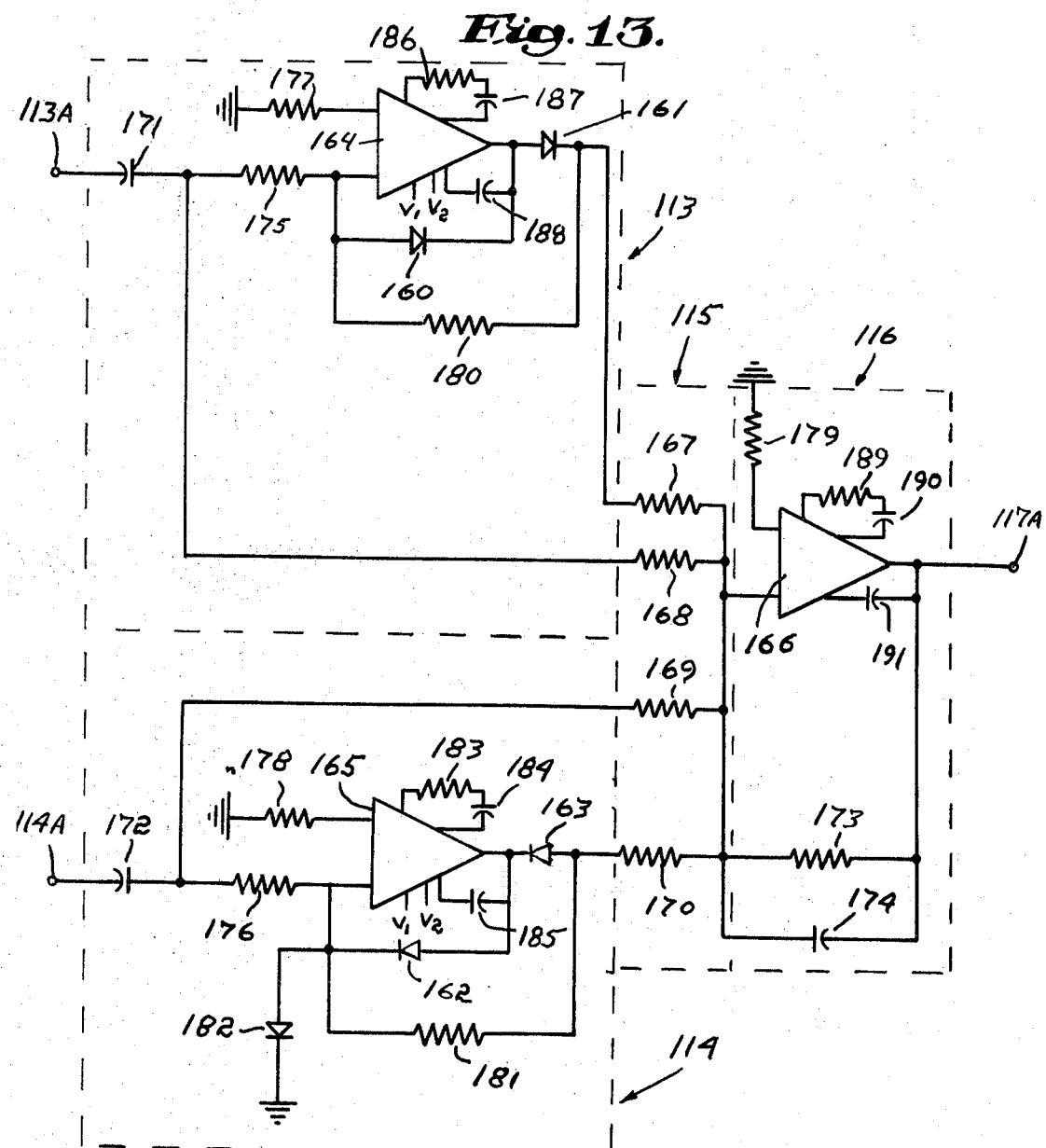

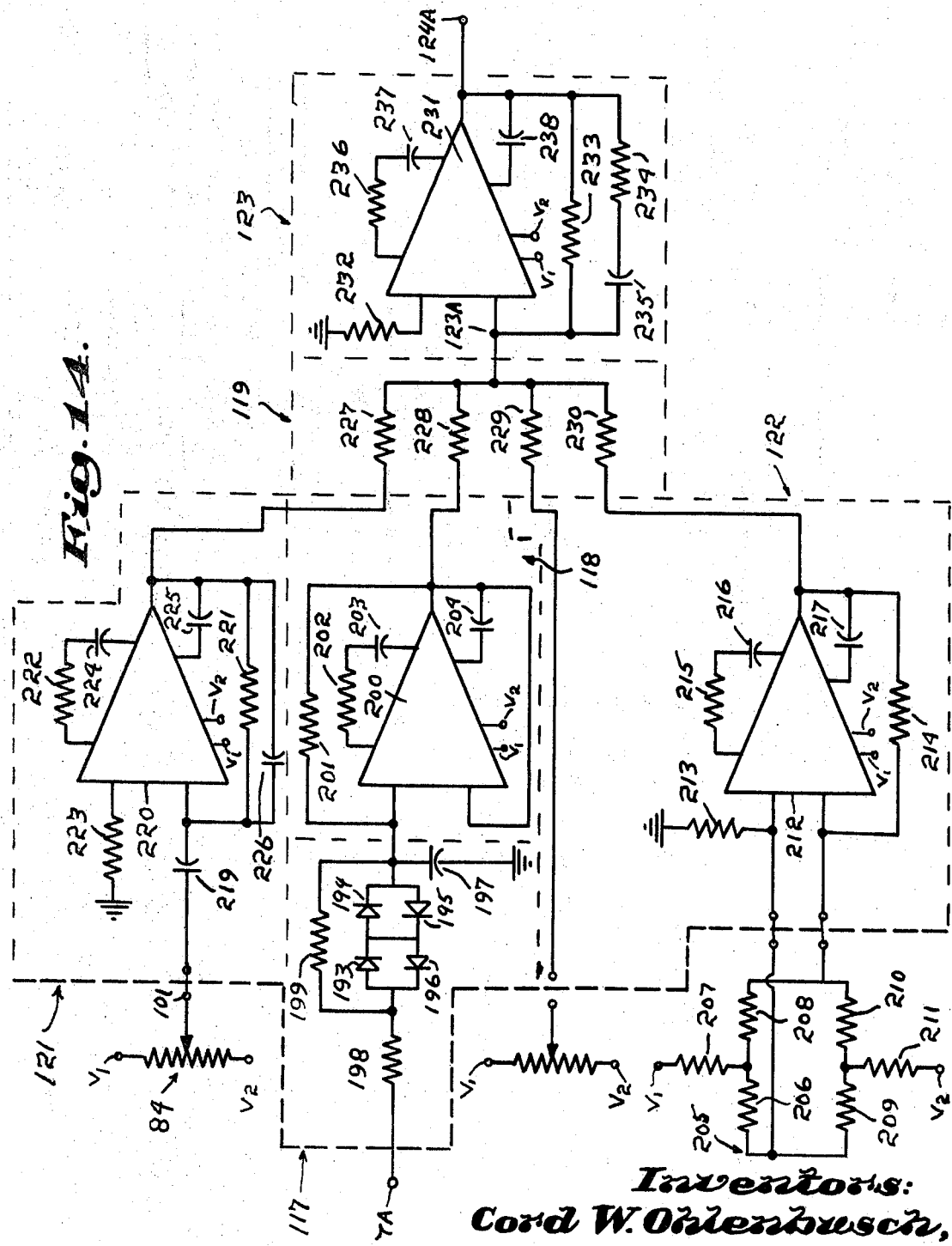

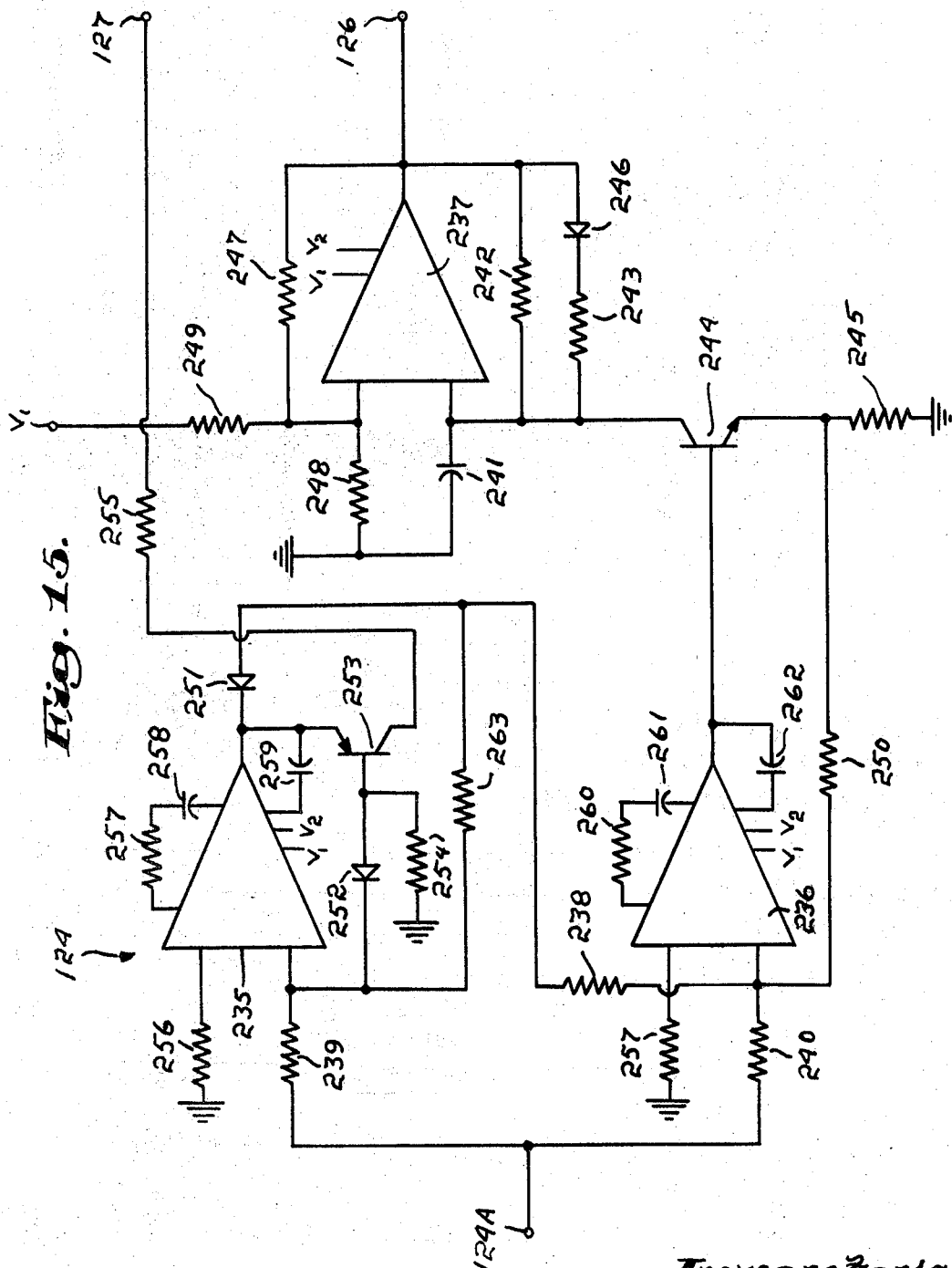

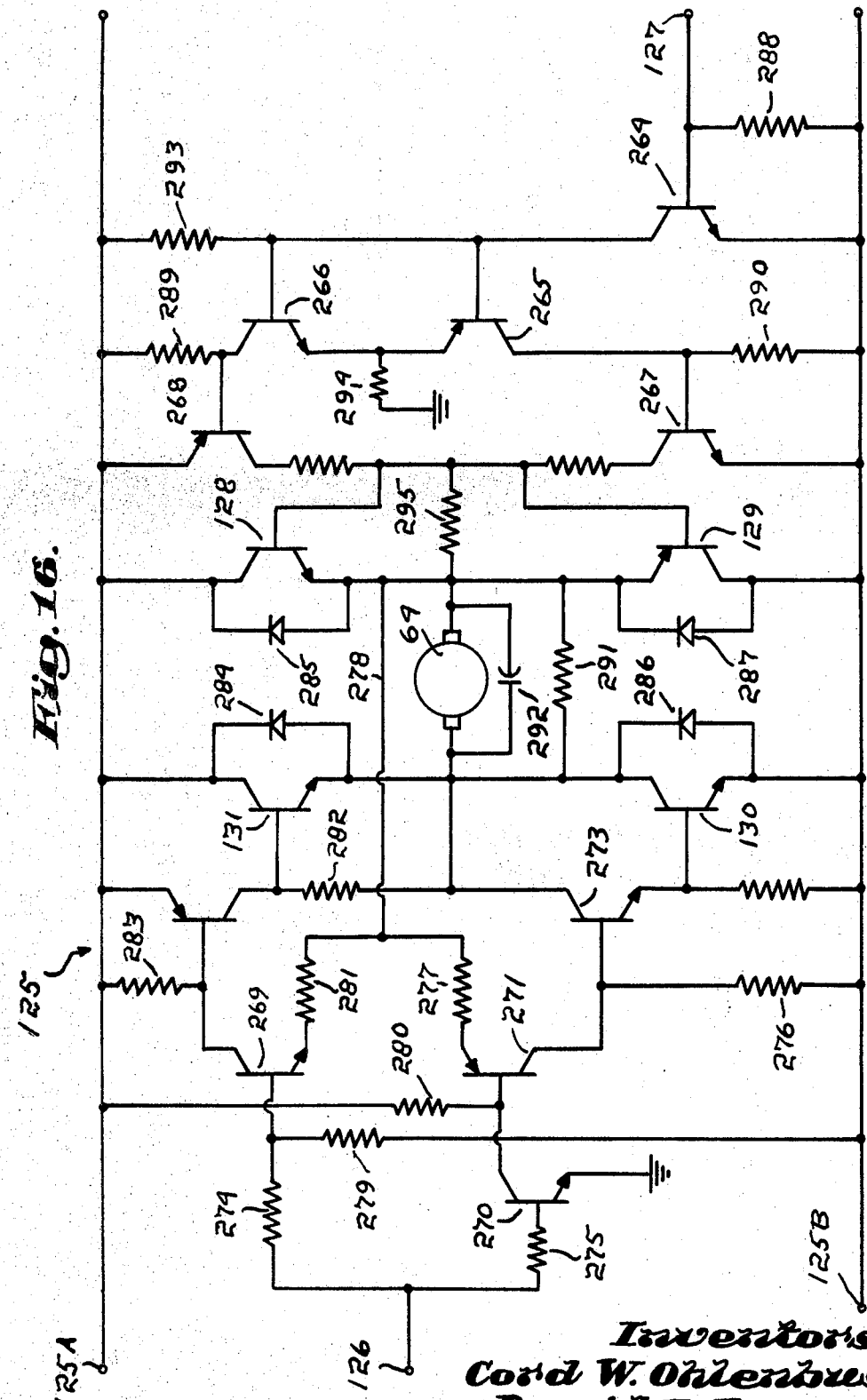

United States Patent Office 3,557,387
Patented Jan. 26, 1971

3,557,387
EXTERNALLY POWERED JOINT PROSTHESIS
Cord W. Ohlenbusch, Hopkinton, and David B. Russell, Ashland, Mass., assignors to Liberty Mutual Insurance Company, Boston, Mass., a corporation of Massachusetts
Filed Nov. 12, 1968, Ser. No. 774,789
Int. Cl. A61f 1/00
U.S. Cl. 3—1.1
51 Claims

ABSTRACT OF THE DISCLOSURE

A joint prosthesis is disclosed in an arm embodiment having a first unit providing a stump-receiving socket with a distal support and a second unit to replace the missing member and including framework with a joint-establishing pivot connecting the framework to the support. Joint flexing means carried by the framework includes a direct current, permanent magnet motor and a ball screw driven thereby and received by a ball nut pivotally mounted on the support below the joint pivot. The control circuit for the motor is connectable to a power source and disclosed as utilizing bioelectric signals, electromyographic signals derived from two muscles being one basis of control with each muscle normally moving the now missing member in a direction opposite to that of the other. The control circuit also provides that the signals from each muscle are rectified with opposite signs added and combined so that the resultant is a signal proportional to the difference between the muscle tensions and provides a basis for motor reversal. The prosthesis includes one or more of such features as a fixed mounting of the motor and brake in the framework and the pivotal attachment of the distal end of the ball screw thereto with a flexible, endless drive between the motor shaft and ball screw, a brake that is engaged whenever the motor speed is zero, a force feedback measuring strain transmitted through the ball screw, a velocity feedback derived from the flexing of the prosthetic joint, and a control which opens the motor and brake circuits as long as muscle tension and torque are in balance.

---

The present invention relates to prosthetic joints that are externally powered and bioelectrically controlled.

While such devices may be replacements for or a control for other members, the invention is herein discussed with particular reference to elbow prostheses as it has long been recognized that artificial arms that are now available are not satisfactory even though many amputees acquire substantial skills in their use. The major objections to such arms stem from the fact that their operation depends on the acquisition of skill in using body movements that do not have any natural relationship to the use of the missing arm. In addition, the amount and type of work that can be done with arms operated by such movements is severely restricted.

It has been recognized that an externally powered joint prosthesis subject to bioelectric control would enable amputees to overcome many limitations on their activities that presently available artificial arms force them to accept.

In "Bioelectric Control of Prostheses" by Ralph Alter, Technical Report 446, Dec. 1, 1966, M.I.T. Research Laboratory Electronics, Cambridge, Mass., various factors are discussed as background for the disclosure of an elbow prosthesis utilizing surface electrodes for electromyogram signals from the biceps and triceps, or the remaining parts of those muscles, of the arm of the amputee. The circuitry for the processing of the signals derived from the triceps and the signals derived from the biceps effected their being separately amplified and rectified with opposite signs added to control motor direction and included a low pass filter and the output of the circuitry was the input to the circuit for a direct current, permanent magnet motor and such input was proportional to the differences between the tension of the two muscles.

In "An EMG, Force Sensing, Proportional Rate Elbow Prosthesis" by R. A. Rothchild and R. W. Mann, Proceedings of the Symposium on Biomedical Engineering, Milwaukee, Wis., vol. 1, 1966, an elbow and forearm is disclosed controlled by the circuitry proposed in the above referred-to publication by Alter. The disclosed elbow prosthesis had a first unit representing a part attachable to the stump of the upper arm and a second unit including a frame. The proximal end of the frame was pivotally attached to the lower extremity of the first unit. The actuating mechanism was in the form of a linear assembly consisting of the direct current, permanent magnet motor and a gear box connected to a ball screw by a reverse locking clutch with the ball nut pivotally connected to the first unit above the frame pivot and with the assembly pivotally connected to the frame, the pivot axis being between the motor and the clutch.

The motor circuit included a strain gauge carried by the first unit to measure the total load torque about the elbow. The resulting strain gauge signals were fed back to reduce the motor signal to zero when the effective muscular torque equaled the load torque. In addition, the motor circuit included a velocity feedback derived from the motor to overcome low-level, erratic motion caused by non-linear friction in the transmission.

While the above summarized elbow construction and circuitry demonstrated that an externally powered, prosthetic joint could be operated by electromyogram signals, many mechanical and electrical problems stood in the way of the acceptance of the concept for actual use. These problems stemed from the fact that the transmission did not have a suitable moment of inertia and was also not adapted for use because of its size and weight, the elbow locking means were objectionable in performance, and the circuit, including its feedbacks unsatisfactory in many respects.

The general objectives of the present invention are to eliminate the above generally stated objectionable features and to provide prosthetic joints featuring improved bases of control.

In accordance with the invention, these objectives are attained, as far as transmission requirements are concerned, by providing a first unit, attachable to the person and including a distal support and a second unit including framework with a joint establishing pivot connecting the proximal end of the framework to the support. A direct current, permanent magnet motor is attached to the framework with its drive shaft extending lengthwise thereof and under the control of brake means. A ball screw parallels the drive shaft and is pivotally supported by the framework with its ball nut pivotally attached to the support in spaced relation to the elbow axis. A flexible drive interconnects the motor shaft and the distal end of the ball screw.

Joint locking requirements are met by providing that the brake means be of the type normally in holding engagement with the shaft and electromagnetically disengaged whenever the motor is energized.

The circuitry provides a motor-operating and direction-controlling signal proportional to the difference between the tensions of two muscles, e.g., the biceps and the triceps with which force and velocity feedback signals are combined. In accordance with one objective of the invention, the force feedback has its strain gauge responsive to loads axially of the ball screw and its feedback signals are in opposition to the signals representing muscular effort thus to function to straighten the joint when the strength of the feedback signals exceeds them.

Another objective of the invention is to provide the circuitry with means to deenergize the motor and the electromagnetic means by which the brake is disengaged whenever the velocity of the joint is zero thereby to conserve power. The utility signals resulting from muscular effort causes the motor to again be energized and the brake released.

Another objective of the invention is to provide the circuit with a velocity feedback providing signals opposing those resulting from effort with their strength changing proportionally to the rate at which the arm is flexed and a particular objective of the invention is to provide, for the velocity feedback, a potentiometer type of control driven in response to elbow pivoting in combination with differentiator means to receive the output of the potentiometer and to convert it into a signal indicative of angular velocity.

A further objective of the invention is to provide a motor driven for the prosthetic joint and related control by which the motor is energized in a pulse mode, the pulses to the motor being of variable width and the time lapse between pulses, i.e. pulse repetition rate, also being variable, thereby to conserve power of the power source.

While the invention has been discussed with reference to electromyogram signals from surface electrodes, the electrodes can be implanted. As signals are also available from the nerves that correspond to those derived from the muscles controlled thereby, such signals are to be regarded as electromyogram signals although, at the present time, the preferred mode of operation is by means of signals attendant muscle tensioning and received through surface electrodes.

In the accompanying drawings, there is shown an elbow prosthesis illustrative of these and other of the objectives, novel features and advantages of the invention.

In the drawings:

FIG. 1 is a side view of an artificial arm in accordance with the invention,

FIG. 2 is a plan view of the elbow,

FIG. 3 is a side view thereof,

Figure 8:
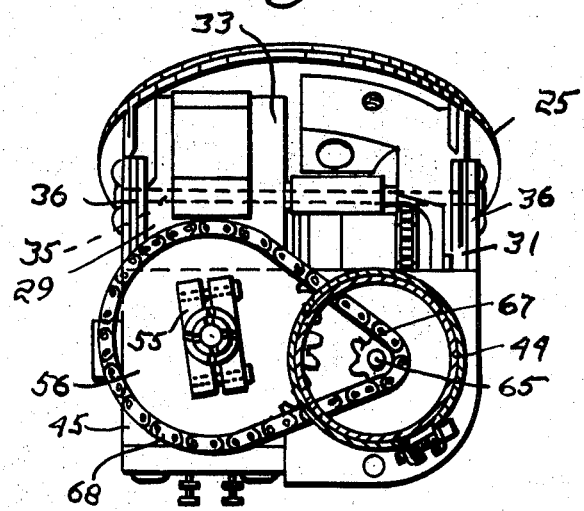
Figure 9:
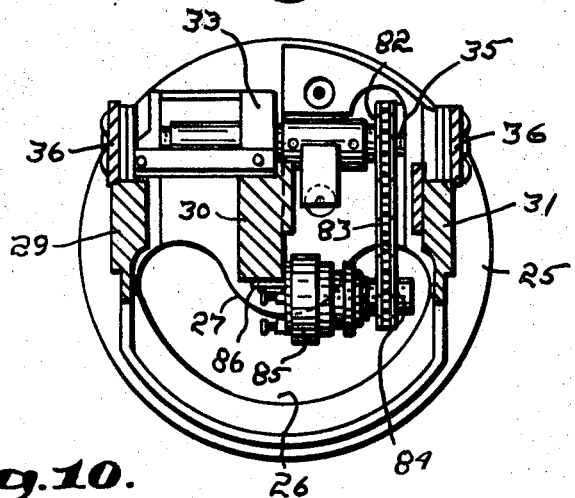
Figure 10:
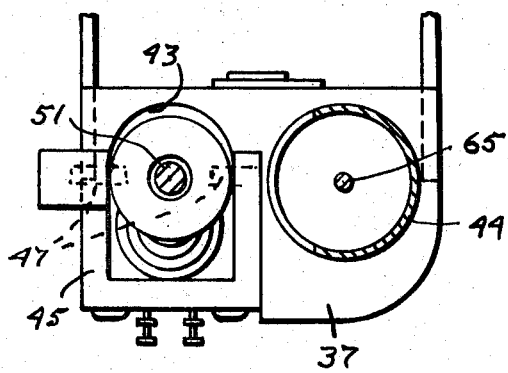

FIG. 4 is a section taken approximately along the indicated lines 4—4 of FIG. 2, FIG. 5 is a section taken approximately along the indicated lines 5—5 of FIG. 2, FIG. 6 is a view of the elbow as seen from its proximal end, FIG. 7 is a view of the elbow as seen from its distal end, FIG. 8 is a section taken along the indicated lines 2—2 of FIG. 3, FIG. 9 is a section taken approximately along the indicated lines 9—9 of FIG. 3, FIG. 10 is a section taken approximately along the indicated lines 10—10 of FIG. 5, FIG. 11 is a block diagram of the circuit, FIG. 12 is a diagrammatic view of the circuits separately amplifying the signals derived from the two muscles, FIG. 13 is a like view of the rectifier circuit, FIG. 14 is a like view of the velocity and strain gauge feedbacks and the signal summer, FIG. 15 is a diagrammatic view of the motor pulse amplifier, FIG. 16 is a like view of the remainder of the circuitry, and FIG. 17 is a diagrammatic view of additional circuitry in accordance with the invention.

The artificial arm, as shown in FIG. 1, has an upper arm section 20 to receive the stump of the upper arm and to be secured by a conventional harness, not shown. The forearm section 21 has, at its distal end, a terminal device such as the conventional hook 22 operated by means of the cable 23 in the accepted manner. The sections 20 and 21 are interconnected by an elbow prosthesis generally indicated at 24 in FIG. 1 and detailed in FIGS. 2–10.

The prosthetic elbow 24 consists of a first unit shown as a circular, adapter plate 25 having an arcuate opening 26 and is to be secured to the distal end of the upper arm section 20, the plate having a central boss 27 provided with a threaded bore 28 for that purpose. The adapter plate 25 is shown as having distally extending supports 29, 30, and 31 laterally spaced along a center line transversely of the plate 25. The supports 29, 30, and 31 include, adjacent the plate 25, forwardly extending shoulders 32, 33, and 34, respectively, with a pivot 35 suitably journalled in the shoulders 32 and 34 and extending freely through the shoulder 33.

A second unit of the prosthesis includes sides 36 having their proximal ends fixed to the ends of the pivot 35 and their distal ends secured to the sides of a mounting block 37 and they are also interconnected by the intermediate brace 38 to provide a support for a board carrying part of the circuitry and indicated generally at 39. The sides 36 have threaded holes 40 to enable the forearm shell 41 to be secured thereto by screws 42, see FIG. 1.

The mounting block 37 has a passage 43 extending through it in a lengthwise direction adjacent one side and a parallel, distally extending cylindrical shell 44 adjacent the other side. A U-shaped transducer holder 45 is held spaced from the distal end of the mounting block 37 by its base 46 which is secured to the undersurface thereof. The arms of the holder 45 carrying inwardly disposed pivots 47 in support of the annular ring 48 centrally of a barrel 49.

A ball screw 50 has an unthreaded end portion 51 of reduced diameter and establishing a shoulder 52 extending through the barrel 49 and supported at one side of the ring 48 by a ball bearing unit 53 held between the shoulder 52 and the barrel ring 48. The distal end of the screw end portion 51 protrudes from the barrel 49 and has a hub 54 locked thereon by a clamp 55. A sprocket 56 is secured to the hub 54 and a ball bearing unit 57 is held between it and the barrel ring 48. The other end of the ball screw 50 is engaged by a ball nut 58 held by a sleeve 59 attached to the supports 29 and 30 below the pivot 35 by pivots 60. A bushing 61 backed by the annular barrel ring 48 confines one end of a telescopic dust shield 62 through which the ball screw 50 extends. The other end of the dust shield 62 is held by a bushing 63 backed by the ball nut 58. The shield 62 is resiliently yieldable from its axially expandable position.

The mounting block 37 has an electric motor 64 secured to its proximal face with its drive shaft 65 extending axially through the shell 44. The motor is a direct current, permanent magnet motor, for example, of a type shown in U.S. Pats. No. 3,025,421 and No. 2,668,926 and has, in the embodiment of the invention illustrated by the drawings, a horsepower rating of .018.

The shell 44 has a transverse slot 66 opening towards the sprocket 56 to enable the drive shaft sprocket 67 to be connected thereto by a chain 68. The motor drive shaft 65 extends forwardly axially through a cylindrical brake, generally indicated at 69. The shell 44 has an annular groove 70 serving to anchor, against axial movement, the clamping ring 71 by which the brake 64 is held in place. The brake 69 is not detailed as it is of the well known type in which brake engagement is effected as by a spring or springs 72 and disengagement effected by the energization of an electromagnet 73, see FIG. 11.

A bracket 74 is secured to the distal end of the brake 67 by a clamping ring 75 and supports framework 76 extending in a proximal direction overlying the brake 69 and providing support for a board carrying another part of the circuitry and generally indicated at 77, see FIGS. 2 and 3. A circular board with yet another part of the circuitry is generally indicated at 78 and indicated as being attached to the distal face of the bracket 74.

From the foregoing, it will be apparent that with the motor in operation, the elbow swings in a direction depending on the direction in which the motor is turning and such swinging is attended by the turning of the pivot 35 which is provided with a stop member 79 engageable with the stop surfaces 80 and 81 provided by the undersurface of the boss 27. The stop member 79 is shaped and dimensioned to permit the elbow to swing to a desired extent, say through 125°.

In addition, the pivot 35 has a sprocket 82 with a chain 83 connecting it to the sprocket 84 of the rotor of a potentiometer 85 mounted in a bracket 86 mounted on the support 30.

Prior to a detailed discussion of the electrical circuitry used in connection with the D-C motor and brake combination, it is in order to discuss the overall functioning of that circuitry with particular reference to FIG. 11 where the direct current, permanent magnet motor is shown at 64 and the spring actuated, solenoid released brake is shown at 69. Power to both the motor and the brake is provided by a battery 102 shown having a plus (+) terminal and a minus (−) terminal with a midtap connected to ground G. (Ground here indicates chassis or common connection.) The battery voltage is reduced in a voltage divider circuit comprising resistances 103 and 105 and diodes 104 and 106 acting in combination to provide a constant potential source for the control circuit hereinafter discussed. It is sufficient to note at this juncture that the outputs from the voltage divider, designated $V_1$ and $V_2$, are fed to the motor control circuit to provide required positive and negative electric potential between $V_1$ and $V_2$ and ground G.

Energization of the complete electrical circuit is effected by closing a switch 107. A solenoid 73 releases braking pressure by compressing a spring 72 in the brake 69, thereby readying the prosthesis system for use. The motor 64 is pulse energized, that is, electric energy thereto is applied in pulses and, as later discussed the width and frequency of the pulses determine the velocity or rate of flexure of the prosthesis since the pulse amplitude, in the preferred embodiment, is determined by the battery which is connected across the motor terminals. The polarity of the voltage input to the motor (as well as the length and frequency of pulse) is determined by circuitry controlled, in part by EMG (electromyogram) or other signals from the body of the wearer in a manner now to be explained.

The EMG signals discussed herein are derived from the triceps and biceps of the wearer. These signals are introduced to the electric circuit in FIG. 11 by pairs of electrodes 109 and 110, respectively. For proper operation of the elbow prosthesis, herein described, a direct current signal is required, however, the EMG signals are alternating. The inputs at terminals 109 and 110 are, therefore, respectively fed to a triceps signal amplifier 111 and a biceps signal amplifier 112 the outputs of which are connected to a rectifier and amplifier 113 and rectifier and amplifier 114, respectively, the rectified and amplified outputs of which are combined in a summer 115 to provide a difference voltage or signal representative of the strength difference between the input EMG signals. The difference voltage should be zero when the biceps and triceps EMG signals are of equal magnitude; it should effect flexure of the prosthesis when the biceps EMG signal is larger than the triceps EMG signal; and it should effect relaxation and downward or straightening movement of the prosthesis when the triceps signal exceeds the biceps signal. The difference voltage thus obtained is amplified by an amplifier 116 and the amplified voltage is fed to a nonlinear filter 117 adapted to prevent energization of the motor circuits in the event of small, spurious EMG signals. The filtered difference voltage is amplified at 118, the output of the amplifier 118 being fed to a summer 119 where it is combined with further signals now to be discussed.

In the operation of a normal limb there is a feedback mechanism to indicate the need for movement, as flexure, but there is, also, a mechanism to indicate rate of flexure or other movement of the limb. In the present device, the circular potentiometer, later discussed, is connected to provide an output voltage indicative of relative angular position of the first unit 20 and the second unit 21. The potentiometer output is connected to the input 120 of a differentiator and amplifier 121 which determines by differential means, the rate of angular change of prosthesis movement as represented by the potentiometer voltage output thereby to give a measure of angular velocity. The amplified velocity signal is also fed to the summer 119 where it is connected to oppose the EMG difference signal.

The holder 45 is provided with a strain gauge indicated at 100 thereby to sense forces upon the forearm portion of the prosthesis, which tend to force the forearm, for example, up or down, but which, in the absence of the strain gauge or similarly acting device, are not sensed by the wearer or the motor control circuitry. As an example, if the prosthesis is holding a load and the load is suddenly removed the bicpets signal will continue to call upon the motor 64 for an upward force. The forearm will move upwardly because of the reduction of the signal produced by the strain gauge and the biceps signal must be reduced proportionately. In this way, the sum signal to the motor can be and is in this condition made equal to zero and no movement occurs. Also if the biceps and triceps EMG signals are equal, there will be, of course, no difference voltage to appear as the output of the amplifier 118. There may be, however, some torque requirement expected from the motor 64 because of load, in which case, the motor operates to reduce the strain gauge signal. The strain gauge 100 again provides an electric output representative of a compressive force along the ball screw axis. The strain gauge output is connected to the input terminal 99 of a strain gauge amplifier 122, the output of which is also fed to the summer 119 where it is combined with the difference signal frim the amplifier 118 and the differential signal from the amplifier 121 again to provide the required motor torque. The summer output is amplified at 123 and the amplified output is connected to a motor pulse amplifier 124 which, in turn, provides one output adapted to provide pulsing of a later-discussed switching amplifier 125 and a polarity signal to effect changes in the polarity of the output of the switching amplifier.

The switching amplifier 125 receives the full output voltage of the battery 102 as well as control signals from the motor pulse amplifier 124. It functions to provide pulse outputs to the motor of uniform amplitude but varying in length of pulse, time between pulses, and polarity. The average power output of the motor is determined by the average time that a potential appears across the motor terminal, and the direction of rotation is determined by the polarity of the applied potential, reversal being effected by reversal of polarity at the terminals.

The switching amplifier is shown in detail in FIG. 16 where the battery inputs thereto are shown at 125A and 125B, and the pulse width signal input and the polarity signal input are introduced at terminals 126 and 127, respectively. The motor 64 is shown connected across two opposite terminals of a Wheatstone-type bridge network each leg of of which comprises a transistor as shown at 128, 129, 130, and 131, and the battery inputs are connected across the other two terminals thereof. Electric current can be made to flow from the terminal 125A through the bridge leg containing the transistor 128, through the motor 64 and thence through the bridge leg containing the transistor 130 to the terminal 125B to produce motor rotation in one direction; to reverse rotation, current is cause to flow through the bridge legs containing the transistors 131 and 129, the transistors 128 and 130 being turned "off" simultaneously with the turning "on" of the transistors 131 and 129. Prior to a detailed discussion of the circuit of FIG. 16, the previously mentioned circuitry will be described in detail.

The amplifier circuitry shown in FIG. 12 is adapted to receive an amplify EMG signals from either the biceps or triceps, that is, to perform the function of either of the amplifiers 111 and 112 in FIG. 11. The EMG signals from the triceps are introduced at 140 and 141 to the amplifier which uses a differential input stage with an amplifier follower. The input stage comprises field effect transistors 142 and 143, the differential output of which is fed to the input of an amplifier 144 through decoupling capacitances 147 and 148. The input impedance to the amplifier circuit of FIG. 12 is kept high by using the field effect transistors 142 and 143 with respective gate leakage resistors 145 and 146 of the order of 10 meghoms in the preferred embodiment. The feedback circuit of the amplifier 144 includes a potentiometer 149 connected between the amplifier 144 output and its negative input terminal to adjust gain resistances 150, 151, and 152, and a capacitance 153, which serves as an attenuator, but primarily provides a high impedance to direct current signals to assure a relatively stable operating point for the amplifier 144. A pair of parallel resistances 154 and 155 provides a leakage path for the amplifier 144 input bias current at one terminal thereof and amplifier stability is enhanced by capacitances 156 and 157 which act, also, together with the capacitances 147, 148, and 153 to provide the proper bandwidth characteristics of the amplifier. The resistance shown at 96 and 97 act as input impedance to the amplifier 144, and further resistances 158 and 159 set the operating points of transistors 142 and 143, respectively.

The circuitry for the signals from the biceps is substantially the same, and accordingly, is not again detailed. Corresponding parts are distinguished by the suffix addition "A" added to the appropriate reference numerals.

The circuitry shown in FIG. 13 is adapted to receive signals from the triceps and biceps amplifiers at 113A and 114A respectively, and to rectify, sum and amplify these signals. Half-wave rectification of the triceps signal is accomplished by diodes 160 and 161 and of the biceps signal by diodes 162 and 163, amplification of the respective signals being effected by amplifiers 164 and 165, the outputs of which are fed to a summer 115 comprising resistances 167, 168, 169, and 170. In the summer 115 the resistances 167 and 170 are of equal magnitude (5,000 ohms in a preferred embodiment) and the resistances 168 and 169 are exactly twice as large. The half-wave output of the amplifier 164, which receives a gain of one, is combined in the summer 115 with alternating current inputs to the resistances 168 and 169 to provide full-wave output from the summer. The summer 115 output is, in turn, amplified by an amplifier 166 and fed to the input 117A of the nonlinear filter 117. The rectified and amplified output from the rectifier and amplifier 113 provides a negative voltage to the summer 115 and the output from the rectifier-amplifier 114 provides a postive voltage. The output of the amplifier 116, thus, is proportional to the difference between the rectified biceps and triceps signal voltages. Decoupling from the amplifiers 111 and 112 is effected by capacitances 171 and 172, respectively, and smoothing of the rectified signal is provided by a resistance 173 and a parallel capacitance 174 which are chosen to have a time constant of 220 milliseconds in the preferred embodiment. Input impedance to the amplifier 164 is provided by a resistance 175 and to the amplifier 165 by a resistance 176, and the resistance in the summer 115 serves as an input impedance to the amplifier 166; leakage paths for the biasing currents of the respective amplifiers is provided by resistances 177, 178, and 179. The resistances designated 180 and 181, act as feedback resistors for the associated amplifiers, as does also the resistance 173 before mentioned. A diode 182 prevents possible lockup of the amplifier 165, and parasitic oscillation in the associated amplifiers is prevented by a resistance 183 and capacitances 184 and 185 in connection with the amplifier 165, a resistance 186 and capacitances 187 and 188 in connection with the amplifier 164, and a resistance 189 and capacitances 190 and 191 in connection with the amplifier 166.

The EMG signal contains a large amount of random amplitude variations even if the muscles producing the signal are under relatively constant tensions. Since it is usually undesirable that the drive motor 64 respond to such variations, the non-linear filter 117 is provided to remove or filter such variations from the EMG signal. The characteristics of the filter 117 are such that it has a large time constant for small amplitude variations and a short time constant for large amplitude changes thereby to effect removal of low amplitude high frequency variations. Since a simple lag filter to provide proper filtration would result in poor frequency response for the overall system, the filter 117 used, as shown in FIG. 14, comprises diodes 193, 194, 195, and 196 in conjunction with a capacitance 197. The time constant of the filter 117 is determined by the effective resistance of the diodes 193–196, which in turn depend on diode current. In the disclosed filter a sudden, large input voltage changes results in high diode current and thus, a low time constant, and, for a small and slow input voltage variation, the time constant is large. Upper and lower limits on the time constant are provided by resistances 198 and 199. The filter output is connected to the amplifier circuit 118 comprising an amplifier 200 having a leakage resistance 201, and a stabilizing resistance 202 and capacitances 203 and 204.

Any force on the terminal device at the prosthesis is measured by a semi-conductor strain gauge bridge 100 which is located to measure force along the ball screw axis, as mentioned. The strain gauge bridge, in the preferred embodiment comprising the elements 206, 208, 209, and 210 each with a resistance of 365 ohms, is driven through the resistances shown at 207 and 211 in FIG. 14 connected between $V_1$ and $V_2$ of the power source. The bridge 100 is connected to the amplifier circuit 122 comprising an amplifier 212 having an input resistance 213. Gain of the amplifier 212 is controllable by the size of a feedback resistance 214 and the stability thereof is maintained by a resistance 215 and capacitances 216 and 217.

Rate of angular motion between the upper arm section 20 and the forearm section 21 of the prosthesis is obtained by measuring angular change therebetween and differentiating the angular change with respect to time, the operation being accomplished by the differentiator and amplifier 121. An input to the differentiator 121 at 101 originates at a circular potentiometer 84, the shaft of which is rotated as the elbow is flexed and provides an input voltage indicative of the angle at the elbow-defining unit. An input capacitance 219 differentiates the potentiometer output and the differentiated output is amplified by an amplifier 220, the gain of which is controlled by the size of a feedback resistance 221. The amplifier is biased by a resistance 222 and stabilized by a resistance 223 and capacitances 224 and 225. A capacitance 226 serves to smooth the output region to reduce inherent noise in the potentiometer 84.

As previously mentioned, the output of the amplifiers 118, 121, and 122, and a balancing signal are fed to the summer 119 shown as comprising resistances 227, 228, 229, and 230. The balancing signal, derived from a potentiometer 192, is introduced at a terminal 192A to the resistance 229. The setting of the potentiometer 192 serves as a bias adjustment for the summer amplifier 123 which receives at its input terminal 123A the output of the summer 119. The summer amplifier 123 comprises an amplifier 231 having an input resistance 232 in addition to the input resistance supplied by the resistances of the summer 119, a feedback resistance 233 to control D-C gain, and a resistance 234 and capacitance 235 to control gain and roll-off characteristics. A resistance 236 and capacitances 237 and 238 serve to prevent high frequency oscillations in the amplifier 231.

The output of the summer amplifier 123 is fed to the input terminal, designated 124A in FIG. 15, of the motor pulse amplifier 124 which comprises amplifiers 235, 236, and 237. The power amplifier 124 acts to control the motor 64 in a switching mode using a pulsed motor input, as mentioned. The input to the amplifier circuit 124 is half-wave rectified by the amplifier 235 and associated diodes 251 and 252 together with the amplifier 236 to perform the rectifier function; this rectifier circuit also produces a polarity signal indicating the sign of the input signal from the summer amplifier 123. The polarity signal is connected to one input 127 of the switching amplifier 125, and the rectified signal is connected through a resistance 263 to the input of the amplifier 235 and is fed also, to one input of the amplifier 236, the other input to which comes from the summer amplifier 123 which, as mentioned, connects to the terminal 124A. The half-wave is combined with the input through the resistance 238 to provide full-wave rectification in the manner previously discussed in connection with FIG. 13. Input resistances 239 and 240 are connected between the terminal 124A and one input of each of the amplifiers 235 and 236, respectively, the other input of the amplifiers being connected to ground G through resistances 256 and 257, respectively.

As previously mentioned, the amplitude of pulses fed to the motor is determined by the voltage of the potential source 102, but the pulse width and time lapse between pulses or pulse frequency are variable. Modulation of the pulses is accomplished in a manner now to be explained. The amplifier 237 functions as an astable multivibrator whose frequency of oscillation is determined by the potential across a capacitance 241 and feedback resistances 242 and 243. The resistance 242 determines the maximum off time of the multivibrator, the resistance 243 determines the minimum on time, and the capacitance 241 modifies the pulse between the limits thus established. The charge on the capacitance 241 is controlled by the amplifier 236 and a transistor 244, the charge being drained through the transistor 244 to ground G through a current sensing resistance 245. The amplifier 236 supplies a variable base current to the transistor 244 thereby to modify the magnitude of the collector current to control charge on the capacitance 241. The amplifier 237 switches states when the potential across the capacitance 241 is above a minimum positive value or below a minimum negative value. A diode 246 allows current to flow through the resistance 243 only when the output of the amplifier 237 is positive, and a resistance 247 acts as the positive feedback necessary for oscillator operation. A resistance 248 functions as an input bias resistance to the amplifier 237 and serves, as well, in conjunction with a resistance 249 to determine the collector voltage on the transistor 244. A feedback from the resistance 245 along a path including a resistance 250 provides an indication to the amplifier 236 of the magnitude of current through the transistor 244. Since the input to the amplifier 235 is derived from the EMG and other signals fed to the summer 119, the amplifier itself acts as a summer which senses how much the transistor 244 is conducting and acts to bias appropriately the transistor depending upon the signals to the summer 119 at that instant. The output of the multivibrator-amplifier 237 is thus a pulsed output, and it is connected to the switching amplifier 125 at a terminal 126 to provide pulse width modulation of the switching amplifier.

Rectification of the input to the amplifier circuit 124 is effected by diodes 251 and 252. A transistor 253 connected to receive the output of the amplifier 235, provides the polarity signal which determines the direction of motor rotation. The base of the transistor 253 is connected to ground G through a resistance 254, and the collector thereof is connected to the terminal 127 through a current limiting resistance 255. Stability of the amplifier 235 is provided by a resistance 257 and capacitances 258 and 259 and like functions are provided by a resistance 260 and capacitances 261 and 262 in connection with the amplifier 236.

There was a previous discussion herein of the switching amplifier 125, which will now be enlarged upon with particular reference to FIG. 16. Assume for now that a positively polarized signal is connected to the input terminal 127. Assume also that the transistors 128–131 are enabled to conduct, the pair which will conduct being determined by the polarity of the signal at 127. Under the assumed conditions a transistor 264 will conduct or be turned on, turning on a transistor 265 and turning off a transitor 266. When the transistor 265 conducts, the bias upon a transistor 267 changes appropriately to turn it on which causes the transistor 129 to conduct. When the transistor 266 is off a transistor 268 is also off, as is also, the transistor 128. The pulse width modulation input to the terminal 126 is adapted to control the transistors 131 and 130 to switch on and off together in a manner determined by the modulation input. However, the operation of the transistors 131 and 130 is controlled, also, by the state of transistors 128 and 129, respectively. Thus, when the transistor 128 is on or saturated, the transistor 131 is forced into cutoff and when the transistor 139 is saturated, the transistor 130 is forced to cutoff, thereby preventing the transistors 131 and 130 from being saturated at the same time and shorting the supply voltages. Upon the conditions discussed current would flow from the positive terminal 125A, through the transistor 131 to the motor 64 and through the transistor 129 to the negative terminal 125B. The foregoing discussion assumes a situation in which the transistor 264 is on. If the state of the transistor 264 were changed to off, current would flow through the transistors 128 and 130, assuming, of course, that the pulse width modulation signal to the terminal 126 enabled the transistors to conduct, as explained hereinafter.

The circuit 125 is adapted to provide energization of the motor 64 when a positive pulse appears at the terminal 126 and to provide for de-energization when a zero pulse appears at the terminal 126. Assume, for now, that there is a positive input to the terminal 126 which is fed through base resistances 274 and 275 to transistors 269 and 270, respectively, the latter transistor being a phase inverter, and that there is a positive input to the terminal 127, as previously discussed. In this circumstance the transistor 269 is switched on which switches on further transistors 271 and 272 and, also, the transistor 131. In addition, the transistor 270 is switched on, but the transistor 271 cannot switch on because its base is connected through a resistance 276, to the negative terminal 125B and its emitter is connected to the same terminal through a resistance 277, an interconnecting conductor 278, and the saturated transistor 129. With the transistor 271 in the off state, a transistor 273 as turned off, effecting or maintaining the transistor 130 in the off state. If the positive pulse is removed from the terminal 126 all of transistors 269, 270, 271, 272, 273, 130 and 131 are forced into cutoff. Bias to transistors 269 and 271 is provided by resistances 279 and 280, respectively, while a resistance 281 is an emitter resistance for the transistor 269 an acts, together with the resistance 277, to provide an interlock between the polarity signal and the transistors 131 and 130. Resistances 282, 283, 288, 289, and 290 are base leakage resistances. High voltage spikes due to current switching through the motor inductance is prevented by diodes 284, 285, 286, and 287. A resistance 291 serves as a minimum load for the amplifier in the event that the motor is disconnected, as for testing, and a capacitance 292 reduces radio interference caused from sparking at the motor brushes. A resistance 293 limits collector current in the transistor 264 and provides base current for the transistor 266. A common emitter resistance 294 prevents the transistors 265 and 266 from being turned on at the present time; and a resistance 295 serves as a common emitter resistance for the transistors 128 and 129.

The electro-mechanical brake serves two functions. It locks the elbow in cases where the amputee wants loads in excess of the electrical capablilities of the externally powered elbow. The brake also conserves motor power when the velocity of the elbow joint is zero.. When an amputee wants to support a load with his flexed elbow the DC motor 64 operates under stall conditions. This implies that electrical power is consumed without producing any mechanical work since the elbow is not moving. To conserve the electrical power the brake is applied by opening the switch 107 and power is removed at the same time from the motor 64. When the wearer wants to move the prosthesis again, the motor is re-energized and the brake is released. In the discussion to follow the brake is made to function automatically during the operation of the prosthesis rather than in the manual mode previously discussed herein. The brake 69, as previously, is spring actuated, solenoid released.

The circuit shown schematically in FIG. 17 performs the automatic brake control function. The output circuit of the velocity signal amplifier 220 is modified in the circuit of FIG. 17 to include transistors 296 and 297. These transistors are biased to the off condition when the velocity signal is zero. When the transistors 296 and 297 are not conducting, there is no current flow in a resistance 298 connected in series with the collectors of each. The resistance 298 serves, also, as the base resistance of a transistor 299 which is also forced into cutoff when the velocity signal is zero, forcing transistors 300, 301, and 302 to cutoff. With the transistor 302 in the off state, no current flows through the coil 73 of the brake and, in the manner previously mentioned, the brake 69 is locked by the spring. Since there is no current flow through the coil 73, the voltage at the emitter of the transistor 302 is the same as that at the + terminal which, in turn, is at the potential of the + terminal of the battery 102. A diode 303, in this circumstance, will conduct passing current through the resistance 240 to the amplifier 236 to turn off power to the motor 64.

The brake can be unlocked by applying a negative signal to the base of the transistor 300 switching it on. This signal is derived from the combined outputs of amplifiers 231 and 235. Any change in steady state conditions of the summing point, i.e. any change in the EMG and strain gauge signal balance will produce a large signal at the outputs of 231 and 235. By proper addition of these outputs through resistances 304 and 305, respectively, the transistor 300 is turned on unlocking the brake 69. Only a small unbalance of the EMG strain gauge signals is required to produce a large output signal from the amplifiers 231 and 235 since, with the motor 64 turned off, the servo system feedback loop is disabled. Once the elbow starts moving, the outputs of amplifiers 231 and 235 are reduced substantially by feedback action. This reduces the base drive of the transistor 300 tending to turn off this transistor. Any non-zero velocity, however, causes current flow in transistor 296 or transistor 297. This in turn will saturate the transistor 299 and supply a new base drive to the transistor 300.

A resistance 306 acts as base leakage resistance. A resistance 307 provides an additional load to the amplifier 220 as required for proper transistor action of 296 and 297. The resistance 298 limits the base current into the transistor 299 while a resistance 308 acts as base leakage resistor. A capacitance 309 produces a time delay between occurrence of zero velocity and locking of the brake. A resistance 310 and the resistances 304 and 305 limit the base current into the transistor 300. A resistance 311 is the base leakage resistor of the transistor 300; a resistance 312 limits base current into the transistor 301 and a resistance 312A is its base leakage resistor. A resistance 313 serves as the base leakage resistor for the transistor 302. An RC network comprising a resistance 314 and capacitance 315 provides positive feedback for fast brake action. A diode 316 is a flyback diode to prevent high voltages across the brake coil 73 when the transistor 302 is turned off; and the diode 303 and resistance 240 apply a positive signal to the negative input of the amplifier 236 reducing motor power to a minimum. The coil 73 has sufficient resistance (240 ohms in the preferred embodiment) to prevent shorting between the positive and negative terminals when the transistor 302 is saturated.

In the preferred embodiment the positive terminal of the battery 102 is +15 volts and the minus terminal is −15 volts. The voltages $V_1$ and $V_2$ are at +9 volts and −9 volts, respectively. In FIG. 14 the amplifier 200 is a high impedance amplifier. While circuit values for the various circuit elements will vary depending upon input voltages, etc., it is of interest to note the relationship between the resistances 167–170 before mentioned. Similarly the resistance 304 (27,000 ohms) is one-half as large as the resistance 305 (54,000 ohms).

The prosthetic elbow as described enables various important objectives to be attained with the joint being flexed and straightened in response to the same neuro-muscular system that would naturally be employed to effect such movements with the prosthetic elbow, utilizing electromyogram signals, the flexing range is about 125° and the control provides a flexing interval of less than two seconds or permits a weight of from ten to fifteen pounds to be raised or lowered. At the same time, the construction ensures desired weight and dimensional limitations to be met, and the circuitry may be grouped on boards as space limitations permit and these may be "plug in" units that may be readily removed and replaced.

We claim:

1. A prosthetic joint comprising a first unit including a stump-receiving socket and a distal support and a second unit including framework, joint-establishing pivot means connecting the proximal end of the framework to said support, a direct current, permanent magnet motor carried by said framework and having a drive shaft extending lengthwise thereof, a ball screw member paralleling said shaft, pivot means adjacent the distal end of said screw member connecting the screw member to the framework, driving means connecting said shaft and screw member and enabling said screw member to turn while pivoting, a ball nut member receiving said screw member, pivot means connecting said nut member to said support with its pivot axis spaced from the joint-establishing pivot means, and a control circuit for said motor connectable to a power source.

2. The prosthetic joint of claim 1 in which the distal support includes an attaching plate at its proximal end and the joint-establishing pivot means is located between the plate and the pivot means for the ball screw member.

3. The prosthetic joint of claim 1 in which the driving means includes sprockets, one on the motor drive shaft and one on the ball screw member, and a chain interconnects the sprockets.

4. The prosthetic joint of claim 1 in which a brake means is in control of the drive shaft and is spaced from the motor lengthwise of the framework and the driving means connects the ball screw member to the shaft between the motor and the brake means.

5. The prosthetic joint of claim 4 in which the brake means is normally engaged and includes electromagnetically operated disengaging means in the circuit and energized only when the motor is in service.

6. The prosthetic device of claim 1 in which the motor shaft extends distally and the connecting means is on the distal side of but close to the pivot axis of the ball screw member.

7. The prosthetic device of claim 1 in which the circuit includes a feedback including a strain gauge and a holder for the support engages one of the members to be responsive to strain axially thereof.

8. The prosthetic device of claim 7 in which the holder is part of the pivot menas of one of the members.

9. The device of claim 8 in which the holder is part of the pivot means for the ball screw member.

10. The prosthetic joint of claim 1 in which the framework includes a mounting block and side members connecting the mounting block in distally spaced relationship to the joint-establishing pivot means, the mounting block has a passage extending lengthwise herethrough and the pivot means for the ball screw member is connected to the mounting block adjacent the distal end of the screw member.

11. The prosthetic joint of claim 10 in which the ball screw member includes a distal end of reduced diameter providing a shoulder, and the pivot means includes a barrel provided with a central ring through which said distal end extends, a U-shaped holder including a base part secured to the mounting block and barrel supporting pivots connected to the ring, and ball bearing units on each side of the ring in support of said distal end, and a strain gauge is supported by the holder.

12. The prosthetic joint of claim 1 in which the circuit includes a feedback and the feedback includes a circular potentiometer mounted on the support and its motor includes a sprocket, the joint-establishing pivot means turns as the framework swings and includes a sprocket, and a chain interconnects the sprockets.

13. The prosthetic joint of claim 12 in which the rotor sprocket is smaller than the sprocket on the joint-establishing pivot means.

14. The prosthetic joint of claim 11 in which as self-extending telescoping dust seal receives the ball screw member freely within it and is confined axially between the pivot means for the ball screw member and the ball nut member.

15. The prosthetic joint of claim 11 in which the pivot means for the ball nut member includes a sleeve freely receiving the ball screw member and the ball nut member is secured to the distal end of the sleeve.

16. The prosthetic joint of claim 10 in which the passage for the ball screw member is adjacent one side of the mounting block and the mounting block includes a support adjacent its other side including a distally extending shell through which the motor shaft extends, and a brake means is in control of the other end of the drive shaft and is attached to the distal end of the shell.

17. The prosthetic joint of claim 10 in which the brake means is of the normally engageable type and includes electromagnetically operated disengaging means in the control circuit.

18. A prosthetic joint comprising a first unit including a distal support and a second unit including framework, joint-establishing pivot means connecting the proximal end of the framework to said support and means carried by said framework and connected to said support to vary the angular relation between the two units, said means including a direct current motor and a circuit for said motor connectable to a power source, and providing motor operating signals, said circuit including feedback means operable to vary the strength of the motor operating signals proportionately to the rate at which said angular relation changes, said feedback means including a potentiometer carried by one unit, a connection between said potentiometer and the other unit operable to adjust the potentiometer as the joint is flexed and straightened, and a differentiator to receive the output voltage of the potentiometer and to convert it into a signal indicative of velocity.

19. The prosthetic device of claim 18 in which the pivot means turns as the framework swings relative to the first unit, the potetiometer is mounted on the first unit and is of the circular type having a rotor, and a drive connects the rotor to the pivot means.

20. The prosthetic device of claim 19 in which the drive consists of sprockets, one connected to the rotor and the other fixed on the pivot means, and a chain is trained about the sprockets.

21. The prosthetic device of claim 20 in which the rotor sprocket is smaller than the pivot means sprocket.

22. The prosthetic joint of claim 18 in which the support includes a pair of stops and the pivot means includes a stop member engageable with the stops in the alternative thereby to limit the extent to which the second unit may swing relative to the first unit in either direction.

23. A prosthetic joint having, in combination, a first unit including a distal support and a second unit including framework, a joint-establishing pivot connecting the proximal end of the framework to said support, joint flexing and extending means including a direct current motor, and control means connected to said motor, said control means comprising means to receive at least two electric signals from the body of the wearer of the prosthesis each of which is proportional to the tension of one of two muscles, each muscle normally moving the missing member in a direction opposite to that effected by the other, velocity indicating means for providing an electric signal as a function of angular velocity of flexture and extension, the velocity indicating means including a potentiometer to provide an output voltage that changes at a rate determined by the angle between the two units and a differentiator to receive the output voltage and convert it to a signal indicative of angular velocity, the output of the differentiator and the electric signals from the body of the wearer being combined in a summer to provide a combined signal output to control the motor, the polarity of the summer output being determined by the combined inputs thereto.

24. The prosthetic joint as claimed in claim 23 in which the two electric signals from the body are combined to provide a difference signal and it is the difference signal that is combined with the output of the differentiator to provide a further difference signal.

25. The prosthetic joint as claimed in claim 24 having a strain gauge disposed in the joint and adapted to provide an electric signal representative of a force exerted at the joint, the strain gauge signal being combined with said difference signal and the output of the differentiator.

26. The prosthetic joint as claimed in claim 23 in which the motor is connected across two opposite terminals of a Wheatstone bridge comprising a transistor in each leg of the bridge and a power source is connected across the other two terminals, electric current flow through the bridge being through two legs when the summer output is at the one polarity and through the other two legs when the summer output is at the other polarity, thereby to change the polarity of electric input to the motor.

27. The prosthetic joint as claimed in claim 26 in which a brake is provided to receive the shaft of the electric motor and selectively prevent rotation of said shaft.

28. The prosthetic joint as claimed in claim 27 in which the brake is spring actuated and solenoid released, the solenoid being connected across said power source, and switch means adapted to energize and de-energize said solenoid.

29. The prosthetic joint as claimed in claim 23 having a non-linear filter to receive said two electric signals, the filter comprising diodes having non-linear voltage-current characteristics to provide large time constants for small amplitude variations of the signal and short time constants for large amplitude changes.

30. The prosthetic joint as claimed in claim 29 in which the filter output is rectified and amplified by a high impedance follower amplifier and the differentiator is adapted to amplify the differentiated potentiometer output, the amplified signals being combined in the summer.

31. The prosthetic joint as claimed in claim 27 in which a brake control circuit is provided, said brake control circuit being adapted to effect engagement of the motor shaft by the brake whenever there is zero output from the differentiator.

32. The prosthetic joint as claimed in claim 31 in which the brake is spring actuated and solenoid released, the coil of the solenoid being connected to said power source, and a transistor connected to control the flow of electric current in said solenoid.

33. The prosthetic joint as claimed in claim 32 in which current flow through the coil of the solenoid is initiated by utility signals resulting from the muscles of the body of the wearer, the utility signals being introduced to the transistor to effect conduction thereof.

34. The prosthetic joint as claimed in claim 33 in which a diode is connected between the transistor and the solenoid to sense when there is no current flow in the solenoid to turn off power to said motor.

35. The prosthetic joint as claimed in claim 33 having a strain gauge disposed at the joint and adapted to provide an electric signal representative of a force at the joint, the strain gauge signal being combined with said difference signal and the output of the differentiator, the combined signal being the utility signal introduced to the transistor.

36. The prosthetic joint as claimed in claim 23 in which the control means is connected to an electric potential source and is adapted to energize the motor in a pulse mode, the pulses to the motor being of variable pulse width and the time lapse between pulses also being variable.

37. The prosthetic joint as claimed in claim 36 in which the source of the pulses comprises an astable multivibrator, the width of the output pulse and the time lapse between pulses being determined by the potential across a capacitance and in which the charge on the capacitance is controlled by a transistor.

38. The prosthetic joint as claimed in claim 37 in which the pulse-control transistor is biased by an amplifier and in which a feedback signal produces an indication to the amplifier of the magnitude of current through the transistor.

39. A prosthetic joint having, in combination, a first unit including a distal support and a second unit including framework, a joint-establishing pivot connecting the proximal end of the framework to said support, joint flexing and extending means including a direct current motor, and control means connected to said motor, said control means comprising means to receive at least two electric signals from the body of the wearer of the prosthesis each of which is proportional to the tension of one of two muscles, said muscles normally controlling the same member but in opposite directions, the receiving means including a non-linear filter comprising diodes having non-linear voltage current characteristics to provide large time constants for small amplitude variations of the signals and short time constants for large amplitude variations and being further adapted to combine the two signals to provide a difference signal, the difference signal being combined in a summer with further signals to provide a combined output to control the motor.

40. A prosthetic joint having, in combination, a first unit including a distal support and a second unit including a framework, a joint-establishing pivot connecting the proximal end of the framework to said support, flexion and extension means including a direct current motor, control means for said motor connectable to a source of electric potential, said control means being adapted to energize the motor in a pulse mode, the pulses to the motor being of variable pulse width and the time lapse between pulses also being variable.

41. The prosthetic joint as claimed in claim 40 in which the control means is adapted to receive at least two electric signals and to combine the two signals to provide a difference signal, the pulse width and the time lapse between pulses as well as the polarity of the electric potential determined at least in part by said difference signal.

42. The prosthetic joint as claimed in claim 41 in which the signals are EMG signals derived from the body of the wearer of the prosthesis each of which is proportional to the tension of one of two muscles, each muscle normally moving the member in a direction opposite to that effected by the other.

43. The prosthetic joint as claimed in claim 42 and including velocity indicating means for providing an electric signal as a function of angular velocity of flexion and extension, the velocity indicating means including a potentiometer to provide an output voltage that changes at a rate determined by the velocity of flexion and extension and a differentiator, the electric signals from the body of the wearer being combined with the output of the differentiator, the pulse width and the time lapse between pulses as well as the polarity of the electric potential delivered to the terminal of said motor being determined at least in part by said combined signal.

44. The prosthetic joint as claimed in claim 43 having a strain gauge disposed to provide an electric signal representative of a force exerted at the joint, the strain gauge signal being combined with said difference signal and the output of the differentiator to provide a summed output, the pulse width and the time lapse between pulses as well as the polarity of the electric potential delivered to the terminal of said motor being determined at least in part by said summed output.

45. The prosthetic joint as claimed in claim 41 in which the motor is connected across two opposite terminals of a Wheatstone-type bridge network each leg of which comprises a transistor and the source of electric potential is connected across the other two terminals, motor rotation being effected in one direction by passing current from the source through the transistor in one leg of the network through the motor to the opposite leg and through the transistor in the opposite leg, reversal of rotation being effected by passing current through the other two transistors in the network.

46. The prosthetic joint as is claimed in claim 45 in which a brake is provided to receive the shaft of the electric motor and selectively prevent rotation of said shaft.

47. The prosthetic joint as claimed in claim 40 in which a brake control circuit is provided, said brake control circuit being adapted to effect engagement of the motor shaft by the brake whenever there is zero output from the differentiator.

48. The prosthetic joint as claimed in claim 47 in which the brake is spring actuated and solenoid released, the coil of the solenoid being connected to said power source, and a transistor connected to control the flow of electric current in said solenoid.

49. The prosthetic joint as claimed in claim 48 in which current flow through the coil of the solenoid is initiated by utility signals derived from the muscles of the body of the wearer, the utility signals being introduced to the transistor to effect conduction thereof.

50. The prosthetic joint as claimed in claim 49 in which a diode is connected between the transistor and the solenoid to sense when there is no current flow in the solenoid to turn off power to said motor.

51. The prosthetic joint as claimed in claim 49 having a strain gauge to provide an electric signal representative of a force at the joint, the strain gauge signal being combined with said difference signal and the output of the differentiator, the combined signal being the utility signal introduced to the transistor.

References Cited

UNITED STATES PATENTS

| | | |
|---|---|---|
| 3,323,515 | 6/1967 | Swanson. |
| 3,418,661 | 12/1968 | Allison et al. |
| 3,423,765 | 1/1969 | Salisbury, Jr. |
| 3,491,378 | 1/1970 | Ioffe et al. |

ADELE M. EAGER, Primary Examiner

J. B. MITCHELL, Assistant Examiner